(12) United States Patent
Goff et al.

(10) Patent No.: US 11,777,207 B2
(45) Date of Patent: Oct. 3, 2023

(54) VIRTUAL PHASED-ARRAY FOR COHERENT, DISTRIBUTED, AND DYNAMIC APPLICATIONS

(71) Applicant: ENSCO, Inc., Springfield, VA (US)

(72) Inventors: Daniel Thomas Goff, Springfield, VA (US); William Todd Faulkner, Springfield, VA (US); Michael Lee Picciolo, Springfield, VA (US)

(73) Assignee: ENSCO, Inc., Springfield, VA (US)

( * ) Notice: Subject to any disclaimer, the term of this patent is extended or adjusted under 35 U.S.C. 154(b) by 444 days.

(21) Appl. No.: 16/924,691

(22) Filed: Jul. 9, 2020

(65) Prior Publication Data

US 2021/0013603 A1 Jan. 14, 2021

Related U.S. Application Data

(60) Provisional application No. 62/871,971, filed on Jul. 9, 2019.

(51) Int. Cl.
| | |
|---|---|
| *H01Q 3/26* | (2006.01) |
| *H01Q 3/34* | (2006.01) |
| *H01Q 1/24* | (2006.01) |
| *H04B 3/52* | (2006.01) |

(52) U.S. Cl.
CPC ............ *H01Q 3/267* (2013.01); *H01Q 1/246* (2013.01); *H01Q 3/2605* (2013.01); *H01Q 3/34* (2013.01); *H04B 3/52* (2013.01)

(58) Field of Classification Search
CPC ...... H01Q 3/267; H01Q 1/246; H01Q 3/2605; H01Q 3/34; H04B 3/52
See application file for complete search history.

(56) References Cited

U.S. PATENT DOCUMENTS

| | | | |
|---|---|---|---|
| 2020/0059755 A1* | 2/2020 | Kabiri | ................. H04B 5/0056 |
| 2020/0219344 A1* | 7/2020 | Stitt | ...................... H04B 7/043 |

\* cited by examiner

*Primary Examiner* — Ab Salam Alkassim, Jr.
*Assistant Examiner* — Yonchan J Kim
(74) *Attorney, Agent, or Firm* — KAPLAN BREYER SCHWARZ, LLP

(57) ABSTRACT

A virtual phased-array and associated methods are disclosed for coherent transmission and/or reception of radio signals among antenna elements of the array, where the antenna elements are wirelessly interconnected and one or more of the elements may be moving. In one embodiment, clocks of the antenna elements are synchronized based on a first set of measurements of wireless signal(s) transmitted by one or more of the antenna elements. Relative positions and orientations of the antenna elements are determined based on a second set of measurements of wireless signal(s) transmitted after the synchronizing of the clocks. Weight(s) of a manifold vector are determined based on the relative positions and orientations, to calibrate the manifold vector. A plurality of coherent wireless signals are transmitted via two or more of the antenna elements based on the calibrated manifold vector.

5 Claims, 5 Drawing Sheets

300

310

SYNCHRONIZE THE CLOCKS OF PHASED-ARRAY ELEMENTS

320

DETERMINE RELATIVE POSITIONS AND ORIENTATIONS OF PHASED-ARRAY ELEMENTS

330

DETERMINE PHASED-ARRAY MANIFOLD VECTOR

340

DETERMINE PHASED-ARRAY ELEMENT WEIGHTS FOR PHASED-ARRAY ELEMENTS

350

FORM AND TRANSMIT (AND/OR RECEIVE) SIGNAL(S) ALONG PHASED-ARRAY MANIFOLD VECTOR

FIG. 3

VIRTUAL PHASED-ARRAY FOR COHERENT, DISTRIBUTED, AND DYNAMIC APPLICATIONS

CROSS REFERENCE

This disclosure claims the benefit of U.S. Provisional Patent Application Ser. No. 62/871,971 filed Jul. 9, 2019.

TECHNICAL FIELD

This disclosure relates generally to systems, methods, and structures employing phased-array antennas, and more particularly to a virtual phased-array (VPA) for coherent, distributed, and dynamic applications.

BACKGROUND

A phased-array antenna includes a plurality of individual antenna elements that is capable of transmitting or receiving an electromagnetic signal along a preferred direction. Directionality is realized by controlling the phase of a signal at each individual antenna element to form and direct a signal beam through two- or three-dimensional space, or selectively receive a signal beam from a particular direction.

As will be known by those skilled in the art, phased-array antenna systems provide numerous advantages in radar, communications, remote sensing, and the like, including signal-power gains, improved resolution, angle-of arrival-estimation, beam steering and interference suppression, each of which scales with the number of antenna elements employed and their spatial distribution, and which are enabled by the ability to cohere the signals at both a baseband and radio frequency (RF) (i.e., carrier frequency) level.

In many phased-array antenna systems, individual antenna elements are located at fixed positions and are interconnected via physical cables that enable relatively straight-forward synchronization between them. As a result, coherence can be realized via calibration (i.e., calculating the array manifold vector).

An ability to arbitrarily (and/or dynamically) distribute individual antenna elements of a phased-array antenna system offers the potential for additional performance improvements. For example, a dynamic phased-array antenna system may advantageously exhibit an improved scalability, spatial adaptability, mitigate issues due to signal degradation and/or interference, be lower cost, and more. Unfortunately, maintaining coherence between arbitrarily distributed/dynamic antenna elements at a level sufficient for high-performance operation is challenging and has limited the development of such systems.

SUMMARY

An advance in the art is made according to aspects of the present disclosure directed to systems, methods, and structures including a virtual phased-array for coherent, distributed, and/or dynamic applications.

In sharp contrast to the prior art, virtual phased-array systems, methods, and structures according to aspects of the present disclosure advantageously enable coherence through wireless time synchronization and tracking of mobile radio antenna elements of the virtual phased-array. Through real-time wireless synchronization of reference clocks of arbitrarily distributed, mobile radio antenna elements and simultaneously positioning each radio's antenna elements, continuous coherence is maintained of a phased-array comprising such radio elements which enables coherent transmission and/or reception of radio signals. Such wireless phased-array operation results in an enhanced signal-to-noise ratio (SNR) through "cooperative" communications of a network of wireless radio phased-array antenna elements.

As a result, virtual phased-array systems, methods, and structures according to aspects of the present disclosure exhibit greater flexibility by allowing a real-time reconfiguration of the phased-array antenna elements thereby providing for dynamic aperture changes—such as null-steering or emitter location applications where variable angular resolution is required.

Finally, virtual phased-array systems, methods, and structures according to aspects of the present disclosure exhibit greater survivability relative to conventional, fixed phased-arrays since individual phased-array antenna elements of a virtual phased-array according to aspects of the present disclosure may advantageously be replaced or swapped, as operational needs dictate.

Viewed from one aspect, systems, methods, and structures according to aspects of the present disclosure include virtual phased-arrays that are operative for producing and steering one or more signal beams in one or two dimensions and/or selectively receiving one or more signal beams along one or more preferred directions. A VPA according to aspects of the present disclosure may exhibit superior performance characteristics as compared with a prior-art VPA due to: (1) the ability to determine relative position (and optionally orientation) between phased-array antenna elements with a higher precision using multilateration of baseband range measurements based on time-of-arrival, or based on carrier-phase ranges and carrier-phase differences, for RF carrier signals transmitted between corresponding phased-array antenna elements; and (2) a significantly improved ability to cohere phased-array antenna elements via synchronization of at least some of time, frequency and phase of static or dynamic clocks among the phased-array antenna elements.

In some illustrative embodiments, relative position and/or orientation between phased-array antenna elements is tracked based on range and, optionally, range-rate measurements between software-defined radios (SDRs) included in the phased-array antenna elements. This advantageously enables determination of an appropriate phased-array manifold vector and subsequent phased-array element weights that support controllable coherent RF emissions from the VPA.

In some other illustrative embodiments, clocks included in each phased-array antenna element are synchronized via measurements that relate the phase and frequency offset of the clocks relative to one another, and clock-control filters and hardware that "steer" frequencies and phases of at least some remote clocks to frequency and phase of a master clock.

Other illustrative embodiments according to aspects of the present disclosure are afforded additional advantages over the prior art by the fact that wireless clock synchronization can be performed more rapidly and with greater accuracy and precision than is possible with prior-art techniques. In still other illustrative embodiments according to aspects of the present disclosure, phase and frequency synchronization with nearly picosecond-level time transfer (phase synchronization) precision and $10^{-11}$ fractional frequency stability can be achieved with integration times of less than one second.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect". The aspects described above, and other aspects of the present disclosure described herein are illustrated by way of example(s) and not limited in the accompanying drawing.

BRIEF DESCRIPTION OF THE DRAWING

A more complete understanding of the present disclosure may be realized by reference to the accompanying drawing in which:

FIG. 3 is a flow diagram depicting illustrative high-level operation for forming and transmitting a signal beam via virtual phased-array antenna according to aspects of the present disclosure;

FIG. 6 shows a flow diagram of an illustrative single cycle frequency and phase steering/synchronization between Originator (slave) and Transponder (master) according to aspects of the present disclosure.

Figure 1:
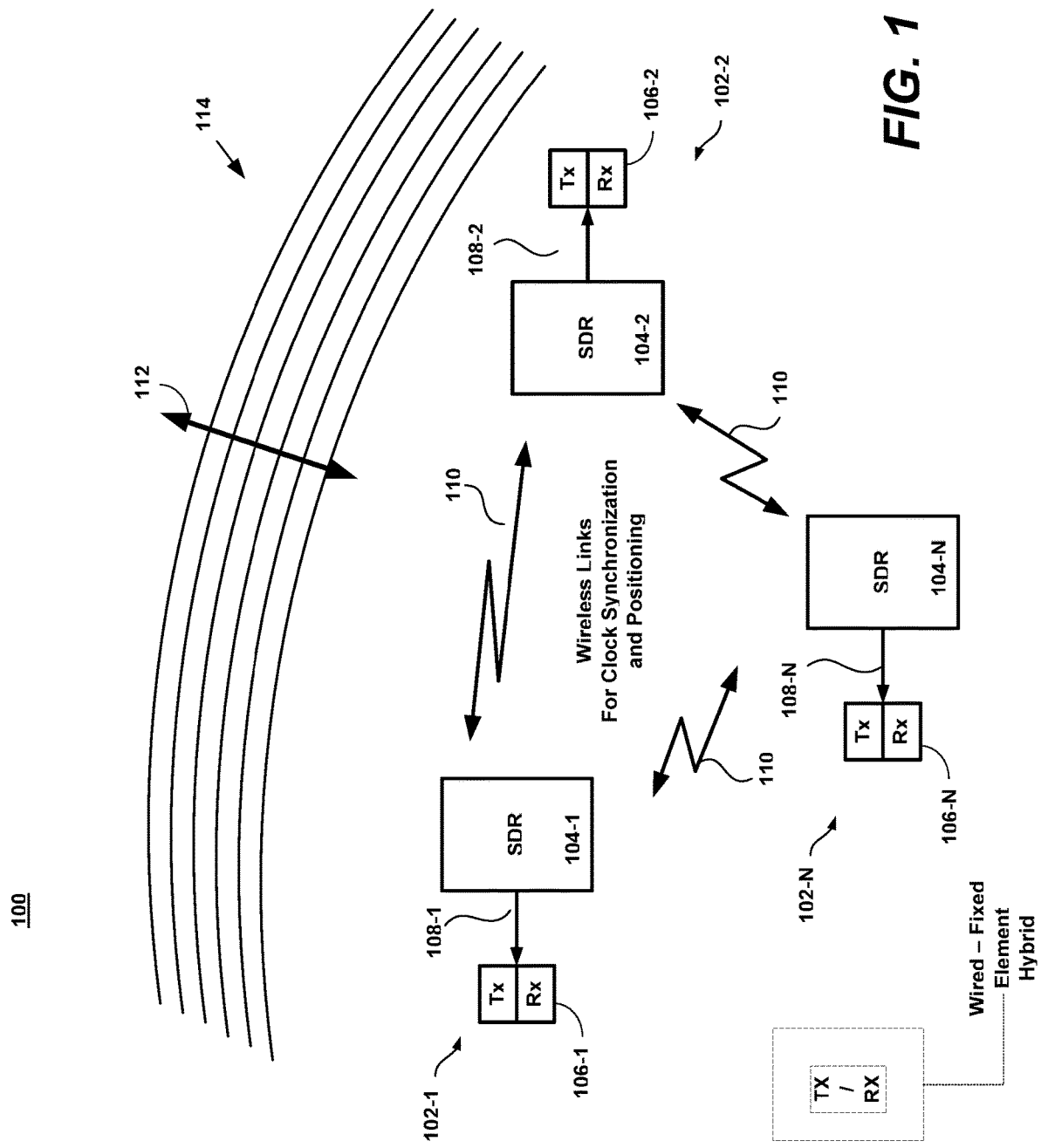
FIG. 1 is a schematic block diagram of an illustrative virtual phased array for an N=3 node system (where N>2) according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

At this point we note that to synchronize two clocks, measurements must be made that relate the phase and frequency offset of the clocks relative to one another, and a clock control filter and hardware and/or software must be in place to "steer" a remote clock's frequency and phase to a master clock's frequency and phase.

FIG. 1 is a schematic block diagram of an illustrative embodiment of a virtual-phased array according to aspects of the present disclosure. As shown, virtual-phased array (VPA) 100 is a coherent, distributed dynamic phased-array that includes phased-array antenna elements 102-1 through 102-N, where N is a positive integer that in practice will be determined by application needs. For convenience, antenna elements 102-1 through 102-N may subsequently be referred to collectively as elements 102.

As shown in FIG. 1, each phased-array antenna element 102-$i$, where i is an integer between 1 and N inclusive, includes respective software-defined radio(s) (SDR) 104-$i$ and a respective transceiver 106-$i$. Each SDR 104-$i$ provides radio signals to transceiver 106-$i$, represented by arrow 108-$i$. While not explicitly illustrated in the figure, it is understood that one or more of the phased-array antenna elements are mobile/movable—both collectively as a group/subgroup or individually, relative to one another—while substantially maintaining desirable transmit and/or receive characteristics of the overall phased-array. We note further that advantageously, one or more of the phased-array antenna elements may be fixed in position while others may be mobile. With continued reference to FIG. 1, shown therein is a wired-fixed element that may be included as part of a virtual phased-array such as that described. Those skilled in the art will appreciate that such fixed phased-array antenna element that are part of a virtual phased-array antenna according to aspects of the present disclosure, need not include an SDR as noted for others. In such configurations, one or more fixed antenna elements are positioned at a known location and its weight/contribution to the manifold likewise is determined/known. Such a wired/fixed phased-array antenna element operates as one of a plurality of elements comprising an overall "hybrid" phased-array.

Communications among/between phased-array antenna elements is provided by wireless links 110 that advantageously provide for wireless clock synchronization(s) among elements as well as location and positioning determination.

When elements are operated according to aspects of the present disclosure, a desired phase front 114 of transmitted/received RF signals is realized having array manifold vector 112.

As will be understood and appreciated by those skilled in the art, VPA establishment and operation according to aspects of the present disclosure employs time-of-flight and clock dynamics measurements to simultaneously provide two fundamental components namely, 1) time, frequency, and phase synchronization of static and dynamic distributed phased-array elements; and 2) relative position tracking of static or dynamic distributed phased-array antenna elements.

To synchronize clocks, measurements must be made that relate the phase and frequency offset of the clocks relative to one another, and a clock control filter and hardware (or equivalent structures) must "steer" a remote clock's frequency and phase to a master clock's frequency and phase. The applicants of the instant application have developed and described such method(s) and attendant elements in U.S. patent application Ser. No. 16/908,255, filed 22 Jun. 2020, entitled SYSTEMS AND METHODS FOR SYNCHRONIZING TIME, FREQUENCY, AND PHASE AMONG A PLURALITY OF DEVICES, the entire contents of which are incorporated by reference as if set forth at length herein.

We note that our method includes making wireless clock offset measurements between a pair or more of distributed software-defined radios (SDRs) as illustratively shown in FIG. 1 and controlling clock dynamics to synchronize frequency, phase, and time of multiple distributed, wireless clocks. This synchronization capability advantageously achieves rapid, accurate, and precise wireless synchronization of reference clocks. Through the use of an illustrative development system, phase and frequency synchronization was demonstrated to near picosecond-level time transfer (phase synchronization) precision and $10^{-11}$ fractional frequency stability in less than 1 second integration time. Those skilled in the art will understand and appreciate that such capabilities enable wireless distribution of reference clock sources, and the dynamic formation of distributed, coherent, radio frequency systems and virtual phased-arrays.

In addition to synchronization, the distributed network of SDRs also simultaneously provide range and, optionally, range rate measurements between software-defined radios (SDRs) which enables tracking the relative position of the SDRs relative to one another.

As will be appreciated by those skilled in the art, one important aspect of creating and operating a phased-array system or virtual phased-array system, is the determination of an appropriate array manifold vector and subsequent array element weights to support controllable coherent RF emissions from the phased-array.

We also note—and as will certainly be appreciated by those skilled in the art—traditional phased-array systems rely on rigid and fixed relative array element placement so that an array manifold vector can be calculated, and weights determined. The unique application of range measurements made concurrently with the frequency and phase synchronization measurements, enables an automatic determination and continuous calibration of the array manifold vector for a virtual phased-array, which also enables dynamic placement of any mobile phased-array elements. A variety of estimation architectures have been implemented to track the relative position and velocity of the elements, including (in order of increasing position accuracy):

a. Multilateration: One estimation architecture includes a simple multilateration algorithm based on the inter-antenna range measurements.
b. Extended Kalman filter (EKF) fusing range and range rate measurements: According to this architecture, range and range rate measurements are fused directly in an EKF. Note that since RF measurements are round-trip, if the RF clock and baseband clock are, or are derived from, the fundamental clock source of the device, the range rate measurements (based on Doppler) and frequency offset measurements can be isolated and computed based on carrier frequency offset measurements on each leg of the measurement transaction.
c. Aided Inertial Navigation System (INS) fusing range, range rate and inertial measurement unit (IMU): Optionally, the integration of the range and range rate measurements with an inertial measurement unit (IMU) in an EKF can significantly improve the relative positioning accuracy As will become apparent to those skilled in the art, systems, methods, and structures according to aspects of the present disclosure employing our VPA approach(es) may advantageously apply to architectures that include a VPA operable as transmitter only, a VPA operable as receiver only or a VPA operable as both transmitter and receiver (transceiver). Of particular advantage, our VPA architectural approach according to aspects of the present disclosure includes a completely independent synchronization system that does not require any external inputs.

Figure 2:
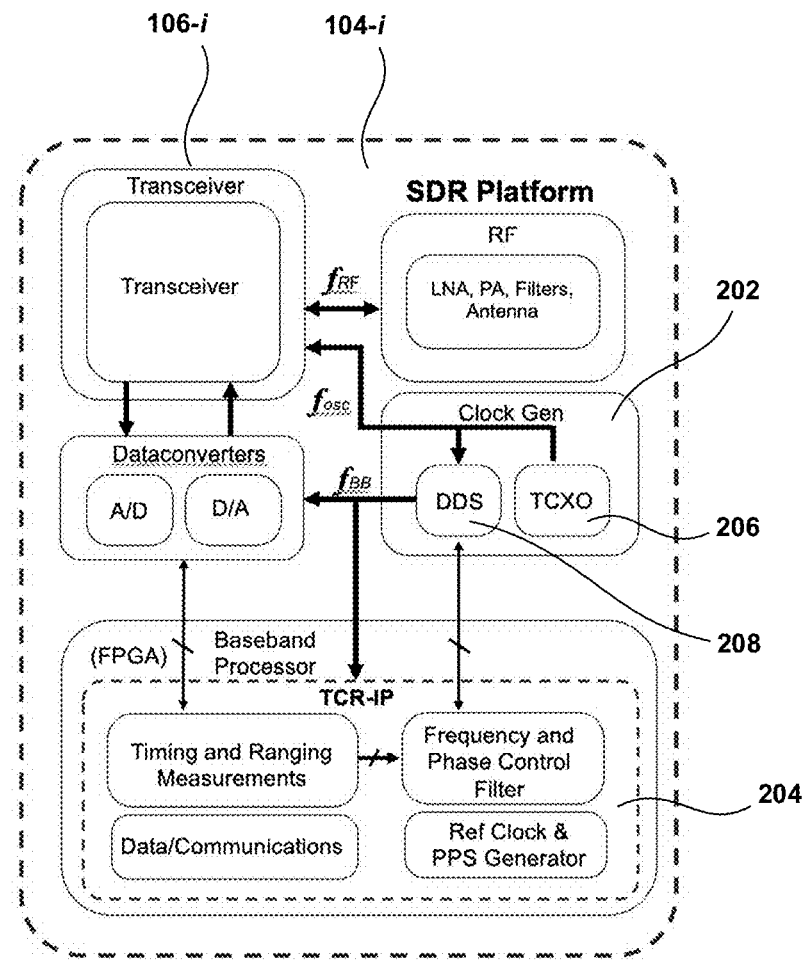
FIG. 2 is a schematic block diagram of an illustrative phased-array antenna element according to aspects of the present disclosure.

Turning now to FIG. 2 there is shown a schematic block diagram of an illustrative phased-array antenna element 102 according to aspects of the present disclosure. Element 102-$i$ is representative of each of elements 102 shown previously in FIG. 1 and includes SDR 104-$i$, clock generator 202, and timing and ranging module 204. Clock generator 202 includes resonator 206 and direct digital synthesizer (DDS) 208. Resonator 206 provides a periodic signal at $f_{ose}$, which is converted by DDS 208 into a baseband clock having a baseband frequency $f_{BB}$ and a baseband phase. Operationally, the baseband clock is the basis for an RF clock having an RF frequency and RF phase.

Examples of software defined radios and clock generators suitable for use in systems, methods, and structures according to aspects of the present disclosure are disclosed and described in U.S. patent application Ser. No. 16/908,255, filed 22 Jun. 2020 by the instant Applicant and—as noted previously—is incorporated by reference as if set forth at length herein.

Timing and ranging module 204 (referred to as TCR-IP module 204) is a module operative for determining—with high accuracy—a relative position and orientation of phased-array antenna element 102-$i$ relative to one or more of the other phased-array elements 102 in system 100 based on time-of-flight measurements for RF signals transmitted between phased-array antenna-element pairs. TCR-IP module 204 and its operation are analogous to timing and ranging systems and methods described in detail in International Patent Applications PCT/US2018/033358, PCT/US2018/033399, PCT/US2018/0401118, and U.S. Pat. No. 8,199,047, each of which is incorporated herein by reference as if set forth at length.

FIG. 3 is a flow diagram depicting illustrative high-level operations/method for forming and transmitting a signal beam via virtual phased-array antenna according to aspects of the present disclosure. We note that although method 300 is described in the context of a VPA configured only for transmission, the teachings of the present disclosure are applicable to VPA systems configured as transmitters only, as receivers only, or for systems configured as both transmitters and receivers (i.e., transceivers). Furthermore, it should be noted that methods and systems in accordance with the present disclosure enable complete independent synchronization that does not require external inputs.

Method 300 begins with operation 310, wherein the clocks of each of elements 102-1 through 102-N are synchronized by controlling clock dynamics to synchronize their frequency, phase, and time.

At operation 320, time-of-flight measurements are used to determine the relative position and orientation of each of elements 102-1 through 102-N. Typically, during operation 320, ranges and, optionally, range-rate measurements between elements 102 are determined to enable tracking the relative position of the antenna elements relative to one another.

At operation 330, array manifold vector 112 is determined based on the results of operation 320. The unique application of range measurements made concurrently with the frequency and phase synchronization measurements, enables a real-time positioning calculation and calculation (determination) of the array manifold vector for a virtual phased-array, which also enables dynamic placement of mobile array elements.

It should be noted that any of several approaches for determining a manifold vector based on the ranges and/or range-rates of elements 102 can be used without departing from the spirit and scope of the present disclosure. For example, in some illustrative embodiments, a manifold vector is determined via a relatively simple multilateration algorithm based on the inter-element range measurements.

In some illustrative embodiments, a manifold vector is determined by fusing range and range rate measurements directly in an extended Kalman filter (EKF). Note that since RF measurements are round-trip, when the RF clock and baseband clock are, or are derived from, the fundamental clock source of the device, the range-rate measurements (e.g., based on Doppler) and frequency-offset measurements can be isolated and computed based on carrier-frequency-offset measurements on each leg of the measurement transaction.

In some illustrative embodiments, the ranges and/or range rates of elements 102 are augmented with inertial data obtained via an integrated Inertial Measurement Unit (IMU) and fused in an EKF, thereby enabling significantly improved accuracy for the relative-position estimations.

At operation 340, array-element weights are determined to enable controllable emission of signal 114 from system 100 as a coherent RF emission.

At operation 350, system 100 forms and transmits signal 114 along manifold vector 112.

Figure 4:
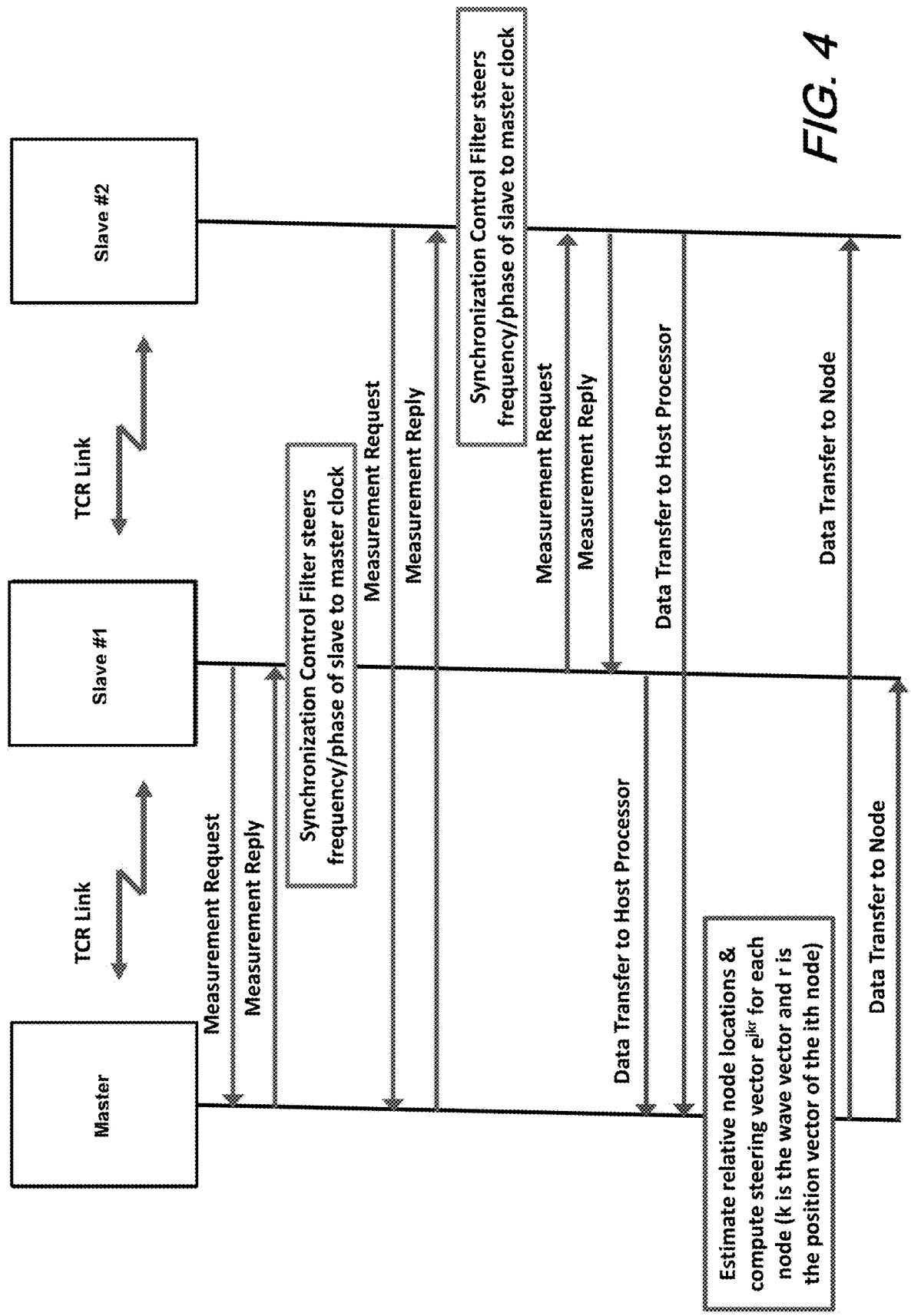
FIG. 4 is a swim lane diagram depicting illustrative VPA operation for a 3-node network of phased-array elements according to aspects of the present disclosure.

FIG. 4 is a swim lane diagram depicting illustrative VPA operation for a 3-node network of phased-array elements according to aspects of the present disclosure. With reference to that figure, it may be observed and understood generally how an arbitrary number of individual radio elements may be configured into a single phased-array of those elements.

As shown in that figure, three elements—master, slave #1, and slave #2, are shown wirelessly interconnected via wireless radio TCR link(s). As noted above, the three elements shown will comprise an illustrative phased-array. Before we describe the transactional flow that occurs among/between the individual elements, we note that while our illustrative phased-array includes three elements, those skilled in the art will understand and appreciate that any sized array may be so configured and employed according to aspects of the present disclosure.

Operationally, upon TCR network configuration a time synchronization between Master/slave(s) occurs wherein each of the individual slaves' synchronization control filter steers the frequency/phase of the individual slave to a master clock. As we shall describe in greater detail, such synchronization/steering results from a defined set of measurements requested/made by the individual elements. Once the frequency/phase of the slaves are steered to the master, measurements are performed among/between the individual slaves as well.

Subsequently, TCR measurements are provided to master (host) processor which uses those measurements to estimate relative element (node) locations and to determine steering vector $e^{ikr}$ for each of the nodes where k is a wave vector and r is the position vector of the ith node. Once the individual steering vectors are determined, they are transferred to the respective node, followed by coherent transmission/reception of radio signals by those nodes.

At this point we note that a particular advantage to systems, methods, and structures according to aspects of the present disclosure is the speed at which the individual elements of a phased-array may synchronize, locate, and configure/reconfigure. Those skilled in the art will readily appreciate that such speed is essential to the successful operation of a phased-array wherein one or more of the individual elements comprising the array are mobile and/or moving.

Figure 5:
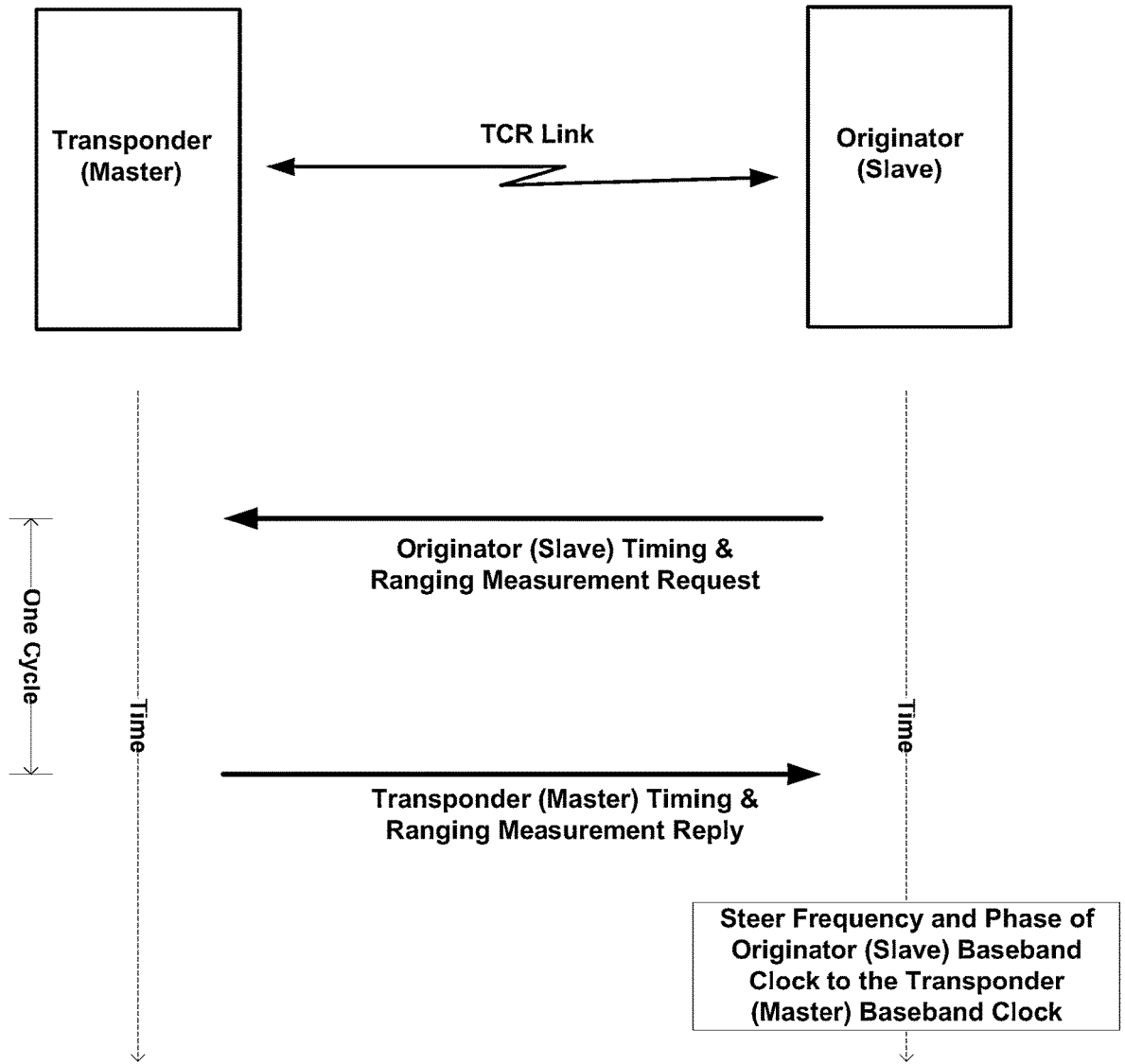
FIG. 5 shows a schematic diagram of an overview of an illustrative single cycle frequency and phase steering/synchronization between Originator (slave) and Transponder (master) according to aspects of the present disclosure.

FIG. 5 shows a schematic diagram of an overview of an illustrative single cycle frequency and phase steering/synchronization between originator (slave) and transponder (master) according to aspects of the present disclosure.

As may be observed from that figure, the originator initiates an exchange by sending a timing and ranging measurement request to the transponder. Note that the details of the exchange are not specifically shown in this illustrative overview.

In response, the transponder transmits to the originator a reply which the Originator uses to define any adjustment "steering" of its baseband clock.

We note that—according to aspects of the present disclosure—such steering and synchronization may advantageously be performed after only a single request/reply cycle between originator and transponder.

FIG. 6 shows a flow diagram of an illustrative single cycle frequency and phase steering/synchronization between originator (slave) and transponder (master) according to aspects of the present disclosure.

As illustratively shown in that flow diagram, an originator begins process with a measurement request by initiating a baseband clock cycle counter and transmitting to the transponder a modulated carrier signal.

Upon receipt of the modulated carrier signal, the transponder starts a baseband clock cycle counter, measures/determines carrier phase, carrier phase slope, code phase, and code phase slope.

As a reply, the transponder begins transmission of a modulated carrier signal and transmits the determinations/measurements and the number of elapsed baseband clock cycles to the originator.

Upon receipt of the reply modulated carrier signal, the originator measures the number of elapsed baseband clock cycles, determines carrier phase, carrier phase slope, code phase and code phase slope.

The originator determines the round-trip time of flight (TOF), baseband phase offset, and baseband frequency offset which is determined from carrier phase slopes.

With these determinations/measurements, the originator steers/adjusts the frequency and phase of the originator baseband clock to the transponder baseband clock. We note that such steering/adjustment may be made to an extent that the clocks are substantially synchronized with one another. We note further that the method shown and described in this figure—while illustratively described with respect to using only a pair of nodes—the process may be extended to a greater number of individual nodes that may constitute a given network of nodes requiring such steering/adjustment/synchronization—such as a phased-array of elements (nodes).

Finally, we note that a recent demonstration of a pair of VPA nodes showed that we can successfully achieve radio frequency (RF) coherency of <4 degrees between two SDR transceivers acting as transmitters, operating up to 200 MHz RF center frequency, by using the wireless time, frequency and phase synchronization link, which results in a virtual phased-array. Coherency was maintained even with simple motion of the VPA nodes. Finally, we note that such phased-array systems according to aspects of the present disclosure are generally agnostic to communications system employed and may advantageously be practiced on most any transactional radio communications where the RF baseband phase, baseband phase rate of change, carrier phase, carrier phase rate of change, and distance are based on a common reference clock and can be measured or recovered over a short period of time.

At this point, those skilled in the art will readily appreciate that while the methods, techniques, and structures according to the present disclosure have been described with respect to particular implementations and/or embodiments, those skilled in the art will recognize that the disclosure is not so limited. Accordingly, the scope of the disclosure should only be limited by the claims appended hereto.

What is claimed is:

1. A method of establishing coherence between a plurality of antenna elements of a virtual phased-array, wherein each of the antenna elements comprises a respective clock, and wherein the method comprises:
    synchronizing the clocks of the antenna elements based on a first set of measurements of a first set of wireless signals transmitted by one or more of the antenna elements;
    determining relative positions and relative orientations among the antenna elements based on a second set of measurements of a second set of wireless signals transmitted after the synchronizing of the clocks;
    determining, based on the relative positions and orientations of the antenna elements, one or more weights of a manifold vector to calibrate the manifold vector, wherein each of the one or more weights is associated with a respective antenna element; and
    transmitting, via two or more of the antenna elements, a plurality of coherent wireless signals based on the calibrated manifold vector.

2. The method of claim 1 wherein the first set of measurements relates phase and frequency offsets of two or more of the clocks.

3. The method of claim 1 wherein the determining of the relative positions and orientations of the antenna elements is via multilateration.

4. The method of claim 1 wherein the second set of measurements comprises range and range rate measurements, and wherein the determining of the relative positions and orientations of the antenna elements comprises fusing the range and rate measurements in a Kalman filter.

5. The method of claim 1 wherein the second set of measurements comprises range and range rate measurements, and wherein the determining of the relative positions and orientations of the antenna elements comprises fusing the range and rate measurements using at least one of an inertial navigation system or an inertial measurement unit.

* * * * *